(12) United States Patent
Tokunaga et al.

(10) Patent No.: US 10,954,790 B2
(45) Date of Patent: Mar. 23, 2021

(54) STEPPED SEALING DEVICE CIRCUMFERENTIAL PUMPING GROOVE

(71) Applicant: EAGLE INDUSTRY CO., LTD., Tokyo (JP)

(72) Inventors: Yuichiro Tokunaga, Tokyo (JP); Masatoshi Itadani, Tokyo (JP); Akira Yoshino, Tokyo (JP)

(73) Assignee: EAGLE INDUSTRY CO., LTD.

( * ) Notice: Subject to any disclaimer, the term of this patent is extended or adjusted under 35 U.S.C. 154(b) by 164 days.

(21) Appl. No.: 16/321,117

(22) PCT Filed: Jul. 19, 2017

(86) PCT No.: PCT/JP2017/026005
§ 371 (c)(1),
(2) Date: Jan. 28, 2019

(87) PCT Pub. No.: WO2018/025629
PCT Pub. Date: Feb. 8, 2018

(65) Prior Publication Data
US 2019/0169988 A1 Jun. 6, 2019

(30) Foreign Application Priority Data
Aug. 2, 2016 (JP) .............................. JP2016-151682

(51) Int. Cl.
*F16J 15/34* (2006.01)
*F01C 19/10* (2006.01)
(Continued)

(52) U.S. Cl.
CPC .............. *F01C 19/12* (2013.01); *F01C 19/08* (2013.01); *F02B 53/00* (2013.01); *F02B 55/02* (2013.01);
(Continued)

(58) Field of Classification Search
CPC .... F02B 2053/005; F02B 55/02; F01C 19/10; F01C 19/12; F01C 19/08; F03B 53/00;
(Continued)

(56) References Cited

U.S. PATENT DOCUMENTS 3,827,701 A * 8/1974 Sakamaki ............... F01O 19/08
277/357
3,836,296 A 9/1974 Sakamaki et al.
(Continued)

FOREIGN PATENT DOCUMENTS

JP S50-072008 A 6/1975
JP S52-036566 B2 9/1977
(Continued)

*Primary Examiner* — Deming Wan
(74) *Attorney, Agent, or Firm* — Harness, Dickey & Pierce, P.L.C.

(57) ABSTRACT

An oil seal member is provided at an outside surface of a member performing whirling motion such as a rotary engine rotor. A sliding face of the oil seal member that slides relatively to a stationary-side member is provided with a step extending circumferentially, and has a relatively high surface formed on one radial side with respect to the step and a relatively low surface on the other radial side. The high surface is provided with pumping grooves to pump oil tending to leak from the high surface side into the low surface side, into the high surface side by sliding relatively to the stationary-side member.

4 Claims, 9 Drawing Sheets

(51) Int. Cl.
  *F01C 19/12* (2006.01)
  *F01C 19/08* (2006.01)
  *F02B 55/02* (2006.01)
  *F02B 53/00* (2006.01)
(52) U.S. Cl.
  CPC ............ *F16J 15/34* (2013.01); *F16J 15/3412* (2013.01); *Y02T 10/12* (2013.01)
(58) Field of Classification Search
  CPC ...... F16J 15/34; F16J 15/3412; F16J 15/3404; F16J 15/3408; F16J 15/3416; F16J 15/3424; F16J 15/3428; B64D 35/06
  See application file for complete search history.

(56) References Cited

U.S. PATENT DOCUMENTS

| | | |
|---|---|---|
| 3,941,523 A | 3/1976 | Shin et al. |
| 3,945,776 A | 3/1976 | Morita |
| 3,969,049 A | 7/1976 | Hermes et al. |
| 4,028,022 A * | 6/1977 | Takeuchi ................ F01O 19/12 418/104 |
| 5,201,531 A | 4/1993 | Lai |
| 2002/0074731 A1* | 6/2002 | Uth ........................ F16J 15/164 277/358 |
| 2005/0263963 A1 | 12/2005 | Lai |
| 2015/0123350 A1* | 5/2015 | Itadani ................ F16J 15/3412 277/400 |

FOREIGN PATENT DOCUMENTS

| | | |
|---|---|---|
| JP | S52-046961 Y2 | 10/1977 |
| JP | S61-082177 U | 5/1986 |
| JP | S61-041921 Y2 | 11/1986 |
| JP | H06-066374 A | 3/1994 |
| JP | 2005-337503 A | 12/2005 |
| JP | 2013-072425 A | 4/2013 |
| WO | WO-2014-024742 A1 | 2/2014 |

* cited by examiner

RELATED ART

FIG. 9

STEPPED SEALING DEVICE CIRCUMFERENTIAL PUMPING GROOVE

CROSS-REFERENCE TO RELATED APPLICATIONS

This application is a U.S. National Stage Application of International Application No. PCT/JP2017/026005, filed on Jul. 19, 2017, and published in Japanese as WO 2018/025629 on Feb. 8, 2018 and claims priority to Japanese Application No. 2016-151682, filed on Aug. 2, 2016. The entire disclosures of the above applications are incorporated herein by reference.

BACKGROUND

Technical Field

The present invention relates, for example, to a sealing device for sealing a side face of a member performing whirling motion such as a rotary engine rotor.

Related Art

In a rotary engine, an oil seal is typically provided between a rotor and a side housing.

The oil seal has a function to prevent oil used for cooling the rotor from leaking into combustion chambers, and to collect an excess of oil supplied for lubrication to gas seal portions such as apex seals, side seals, and corner seals into the inner peripheral side of the oil seal.

Figure 9:
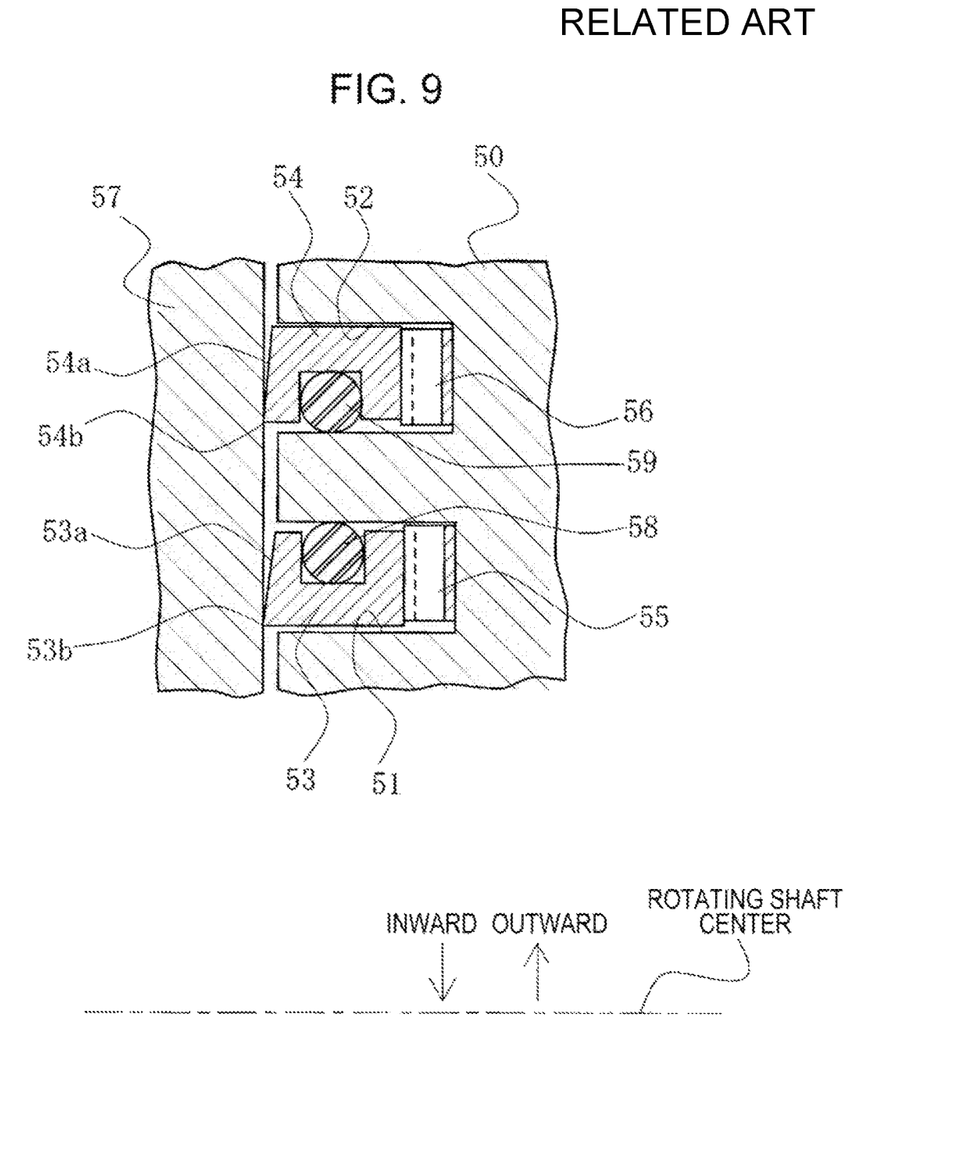
FIG. 9 is a diagram showing Conventional Art 1.

There is known a conventional oil seal in which, as shown in FIG. 9, an annular inner peripheral-side oil seal groove 51 and an annular outer peripheral-side oil seal groove 52 are provided in a side face of a rotor 50, oil seals 53 and 54 having taper-shaped outside surfaces 53a and 54a are fitted into the oil seal grooves 51 and 52, respectively, the oil seals 53 and 54 are biased toward a side housing 57 by springs 55 and 56 interposed between the bottom of the oil seal grooves 51 and 52 and the inside surface of the oil seals 53 and 54, and O-rings 58 and 59 are fitted into the oil seals 53 and 54, respectively. The conventional oil seal serves a function as an oil seal by scraping off oil present on the inner peripheral side of the oil seals 53 and 54 (oil used for cooling the rotor and oil used for lubrication) with inner peripheral-side edges 53b and 54b at a portion of the circumferentially extending oil seals 53 and 54, the portion moving inward with respect to the center of a rotating shaft, so as to prevent the oil from leaking into the outer peripheral side of the oil seal (combustion chamber side), and by guiding oil present on the outer peripheral side of the oil seals 53 and 54 into gaps at the taper-shaped outside surfaces 53a and 54a at a portion of the circumferentially extending oil seals 53 and 54, the portion moving outward with respect to the center of the rotating shaft, so as to lift the oil seals 53 and 54 slightly from the side housing 57, thereby causing the oil seals 53 and 54 to perform the action of drawing oil into the inner-peripheral side of the oil seals 53 and 54 (Hereinafter, it is referred to as "Conventional Art 1." See FIG. 1 of JP S50-72008 A, for example).

There is known another conventional oil seal device in which communication holes communicating with an interior space of a rotor are formed in a seal groove of the rotor holding a seal member so that oil entering a gap between an outside surface of the rotor and a side housing flows into the interior space of the rotor through the communication holes, to prevent oil from flowing into working chambers (combustion chambers) (Hereinafter, it is referred to as "Conventional Art 2." See FIGS. 3 and 6 of JP 2013-72425 A, for example).

Conventional Art 1 and Conventional Art 2 described above, however, cannot completely prevent shear leakage of oil caused by relative motion between the side housing and the oil seal member, and pressure leakage caused by a large centrifugal force acting on oil when the engine rpm increases, for example. Thus a technique to further reduce the leakage rate is required.

It is an object of the present invention to provide a sealing device that reduces both shear leakage of oil associated with relative motion between an oil seal member provided at an outside surface of a member that performs whirling motion such as a rotary engine rotor and a side housing (stationary-side member), and pressure leakage due to centrifugal force of oil associated with the rotation of the member performing whirling motion, by a surface texture provided on a sliding face of the oil seal member, thereby improving sealing performance.

SUMMARY OF THE INVENTION

To attain the above object, a sealing device according to a first aspect of the present invention is a sealing device that seals a gap between an outside surface of a member performing whirling motion such as a rotary engine rotor and a stationary-side member, and includes an oil seal member provided at the outside surface of the member performing whirling motion. The oil seal member has a sliding face that slides relatively to the stationary-side member. The sliding face is provided with a step extending circumferentially, and has a relatively high surface formed on one radial side with respect to the step and a relatively low surface on the other radial side. The high surface is provided with pumping grooves to pump oil tending to leak from the high surface side into the low surface side, into the high surface side by sliding relatively to the stationary-side member.

According to this aspect, shear leakage of oil during shearing can be prevented, and pressure leakage due to centrifugal force acting on oil can also be prevented. Thus, a sealing device improved in sealing performance can be provided.

According to a second aspect of the present invention, in the sealing device in the first aspect, the step is provided circumferentially continuously.

According to this aspect, shear leakage and pressure leakage can be prevented reliably.

According to a third aspect of the present invention, in the sealing device in the first aspect, the step is provided circumferentially intermittently, and a portion not provided with the step is provided with a dam formed by the high surface protruding to the low surface side.

According to this aspect, circumferential escape of fluid can be prevented to take the fluid into the high-pressure fluid side, and thus sealing performance can be further improved.

According to a fourth aspect of the present invention, in the sealing device in the third aspect, the dam is provided at an angle from the low surface side to the high surface side so that the high surface side is located downstream.

According to this aspect, circumferential escape of fluid can be further prevented to take the fluid into the high-pressure fluid side, and sealing performance can be still further improved.

According to a fifth aspect of the present invention, in the sealing device in any one of the first to fourth aspects, the pumping grooves are provided circumferentially independently, an upstream cavitation formation region of each pumping groove is disposed radially close to the low surface side and a downstream positive pressure generation region is disposed close to a side opposite to the low surface side, and fluid drawn in from the low surface side at the cavitation formation region of each pumping groove passes through the pumping groove and is returned from the positive pressure generation region to the side opposite to the low surface side.

According to this aspect, the amount of pumping in pressure leakage can be increased, and pressure leakage prevention effect can be enhanced.

Effects of the Invention

The present invention achieves the following outstanding effects.

(1) The sliding face of the oil seal member that slides relatively to the stationary-side member is provided with the step extending circumferentially, and has the relatively high surface formed on one radial side with respect to the step, and the relatively low surface on the other radial side, and the high surface is provided with the pumping grooves to pump oil tending to leak from the high surface side into the low surface side, into the high surface side by sliding relatively to the stationary-side member, so that shear leakage of oil during shearing can be prevented, and pressure leakage due to centrifugal force acting on oil can also be prevented. Thus, a sealing device improved in sealing performance can be provided.

(2) The step is provided circumferentially continuously, so that shear leakage and pressure leakage can be prevented reliably.

(3) The step is provided circumferentially intermittently, and the portion not provided with the step is provided with the dam formed by the high surface protruding to the low surface side, so that circumferential escape of fluid can be prevented to take the fluid into the high-pressure fluid side, and thus sealing performance can be further improved.

(4) The dam is provided at an angle from the low surface side to the high surface side so that the high surface side is located downstream, so that circumferential escape of fluid can be further prevented to take the fluid into the high-pressure fluid side, and sealing performance can be still further improved.

(5) The pumping grooves are provided circumferentially independently, the upstream cavitation formation region of each pumping groove is disposed radially close to the low surface side, the downstream positive pressure generation region is disposed close to the side opposite to the low surface side, and fluid drawn in from the low surface side at the cavitation formation region of each pumping groove passes through the pumping groove and is returned from the positive pressure generation region to the side opposite to the low surface side, so that the amount of pumping in pressure leakage can be increased, and pressure leakage prevention effect can be enhanced.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

With reference to FIGS. 1 to 6, a sealing device according to a first embodiment of the present invention will be described.

The present embodiment describes, as a sealing device for sealing an outside surface of a member performing whirling motion, an oil seal for sealing a space between an outside surface of a rotary engine rotor and a side housing as an example.

Figure 1:
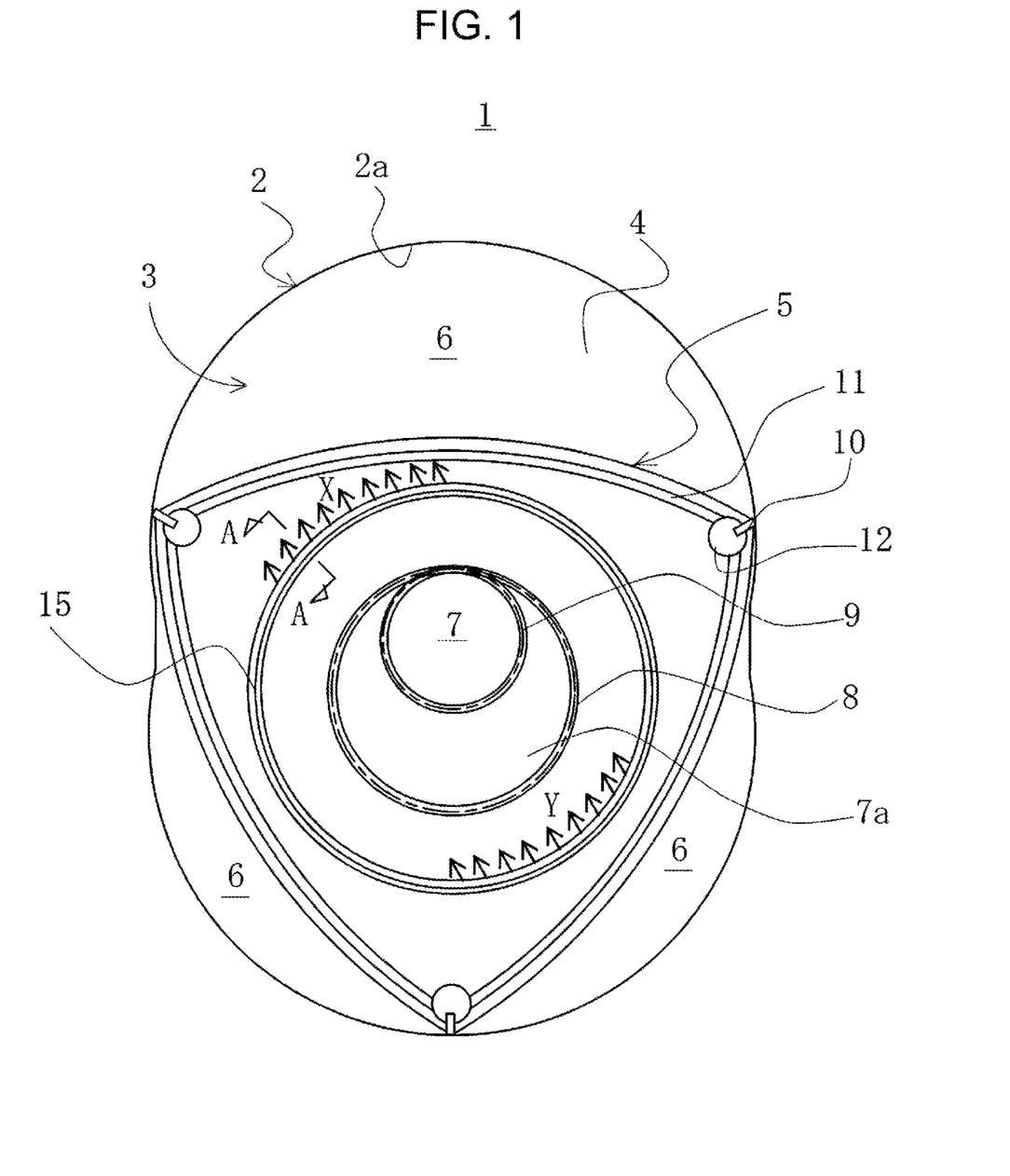
FIG. 1 is a vertical cross-sectional view showing a sealing device according to a first embodiment of the present invention.

FIG. 1 is a vertical cross-sectional view showing the sealing device according to the first embodiment of the present invention.

In FIG. 1, a rotary engine 1 includes a cocoon-shaped rotor housing 2 having a trochoidal inner peripheral surface 2a, side housings 3, a rotor housing chamber 4, a substantially triangular rotor 5 housed in the rotor housing chamber, and three working chambers 6 formed on the outer peripheral side of the rotor 5.

An eccentric shaft 7 is provided through substantially the center of the side housings 3. The rotor 5 is supported rotatably relative to an eccentric wheel 7a of the eccentric shaft 7. An internal gear 8 provided on the inside of the rotor 5 meshes with a fixed gear 9 provided on the side of the side housing 3, rotating around the eccentric wheel 7a while revolving around the axis of the eccentric shaft 7, thereby performing planetary gear motion.

During the planetary gear motion of the rotor 5, apex seals 10 provided at three apexes each contact and slide on the trochoidal inner peripheral surface 2a, sealing a space between the three working chambers 6.

Each outside surface of the rotor 5 is provided with arcuate side seals 11 for connecting between adjacent apexes. The side seals 11 seal a gap between the outside surface of the rotor 5 and the side housing 3. Further, corner seals 12 connecting the side seals 11 are provided at the apexes of the rotor 5.

Cooling oil for cooling the rotor 5 from inside is supplied to an interior space of the rotor 5, and lubricating oil is supplied to the apex seals 10, the side seals 11, and the corner seals 12.

In addition to the above-described side seals 11 and corner seals 12, each outside surface of the rotor 5 is provided with an oil seal member 15 for taking oil present in a gap between the rotor 5 and the side housing 3, that is, cooling oil used for cooling the rotor 5 and an excess of oil lubricating the apex seals 10, the side seals 11, and the corner seals 12, into the radially inner side of the rotor 5 while maintaining an oil film, and preventing the oil from entering the radially outer side of the rotor 5 (working chambers 6) from the radially inner side of the rotor 5.

The oil seal member 15 has a function of taking in oil radially inward by running on oil radially outward while maintaining a predetermined amount of oil film by a predetermined pressing load at a portion moving radially outward with respect to the side housing 3, accompanying the planetary gear motion of the rotor 5, that is, a portion of the circumferentially extending oil seal member 15, the portion moving outward with respect to the center of the eccentric shaft 7 as shown by arrows X, and by preventing oil from entering the radially outer side (working chambers 6) from the radially inner side of the rotor 5 (This is sometimes referred to as "shear leakage" in the description) at a portion moving radially inward with respect to the side housing 3, accompanying the planetary gear motion of the rotor 5, that is, a portion of the circumferentially extending oil seal member 15, the portion moving inward with respect to the center of the eccentric shaft 7 as shown by arrows Y.

At the same time, the oil seal member 15 has another function of preventing oil, which adheres to the outside surface of the rotor 5 and on which centrifugal force acts, with the planetary gear motion of the rotor 5, from leaking out from the radially inner side of the rotor 5 into the radially outer side (working chambers 6) (This is sometimes referred to as "pressure leakage" in the description).

Figure 2:
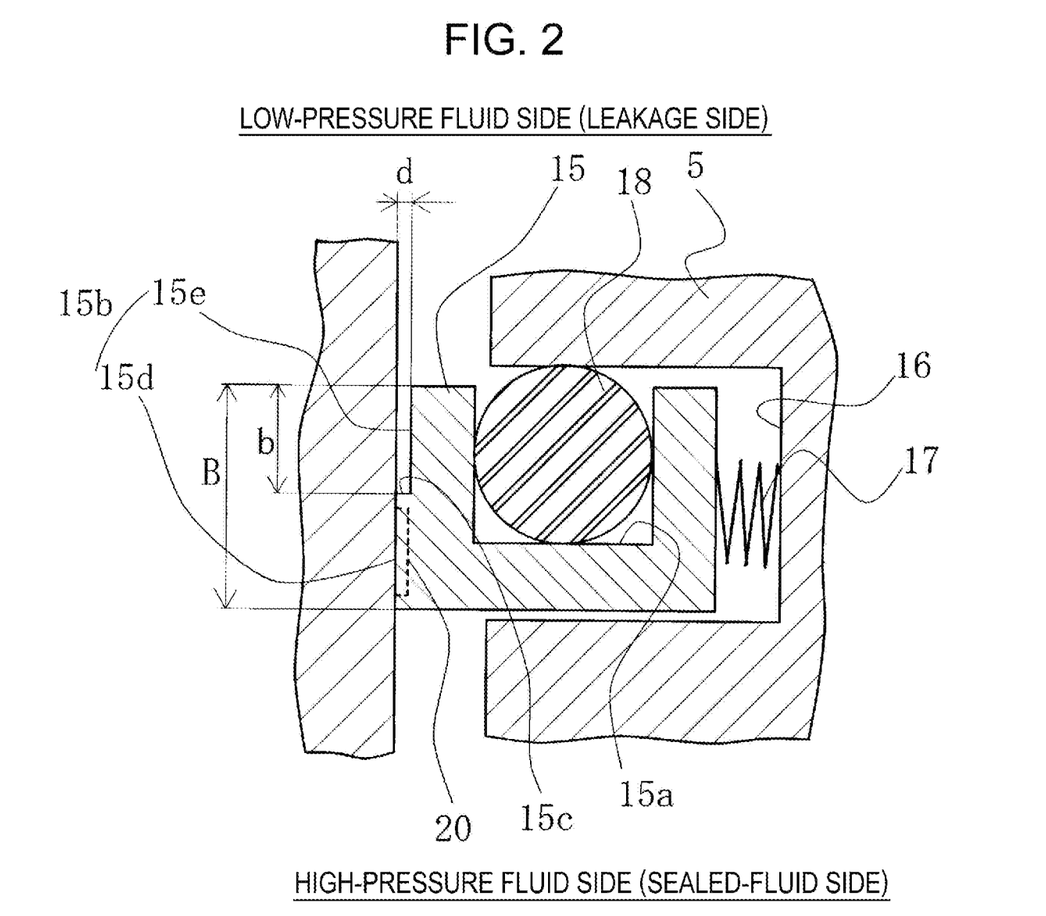
FIG. 2 is a cross-sectional view along A-A in FIG. 1.

FIG. 2 is a cross-sectional view along A-A in FIG. 1. With reference to FIG. 2, the oil seal member 15 will be described.

On the outside surface side of the rotor 5, an oil seal groove 16 having a substantially rectangular cross section is formed. The oil seal member 15 and an elastic member 17 elastically supporting the oil seal member 15 are fitted into the oil seal groove 16.

In the oil seal member 15, an O-ring 18 for preventing oil in the oil seal groove 16 from leaking radially outward of the rotor 5 (upward in the sheet plane of FIG. 2. Hereinafter, this is sometimes referred to as a "leakage side or low-pressure fluid side.") is fitted into an O-ring groove 15a.

A radial step 15c lower on the low-pressure fluid side than on the radially inner side of the rotor 5 (lower side in the sheet plane of FIG. 2. Hereinafter this is sometimes referred to as a "sealed fluid side or high-pressure fluid side.") is provided in a sliding face 15b of the oil seal member 15 opposite to the side housing 3. A land 15d on the high-pressure fluid side of the step 15c slides in direct contact with the side housing 3, whereas a groove 15e on the low-pressure fluid side of the step 15c has a small gap with the side housing 3.

In the present invention, with respect to the step 15c, the "radially outer side (low-pressure fluid side) or the radially inner side (high-pressure fluid side)" of the rotor 5 is sometimes referred to as a "one radial side or the other radial side," and the "land 15d" is sometimes referred to as a "relatively high surface," and the "groove 15e" a "relatively low surface."

The ratio b/B between the width b of the land 15d and the width B of the sliding face 15b is set to about 0.5, for example.

A dimension d of the step 15c is set to an optimum value according to the type of oil, the number of revolutions of the eccentric shaft 7, and pressure. This point will be described in detail later.

Figure 3A:
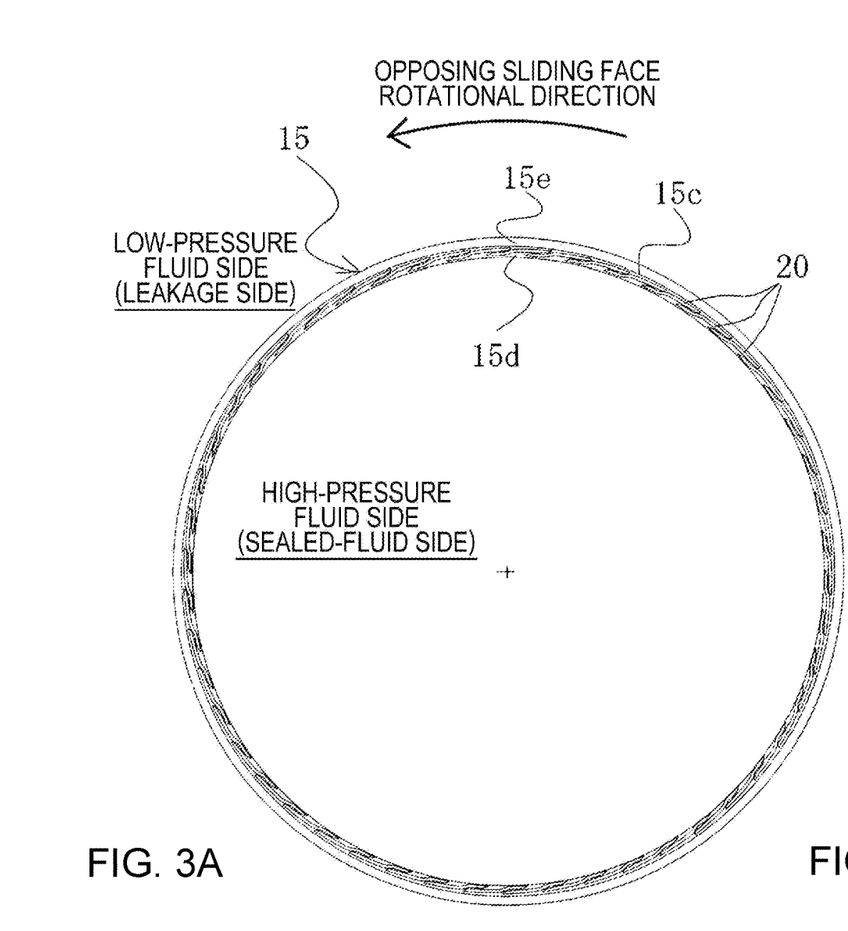
FIG. 3A is an overall view showing a sliding face of an oil seal member of the sealing device according to the first embodiment of the present invention.
Figure 3B:
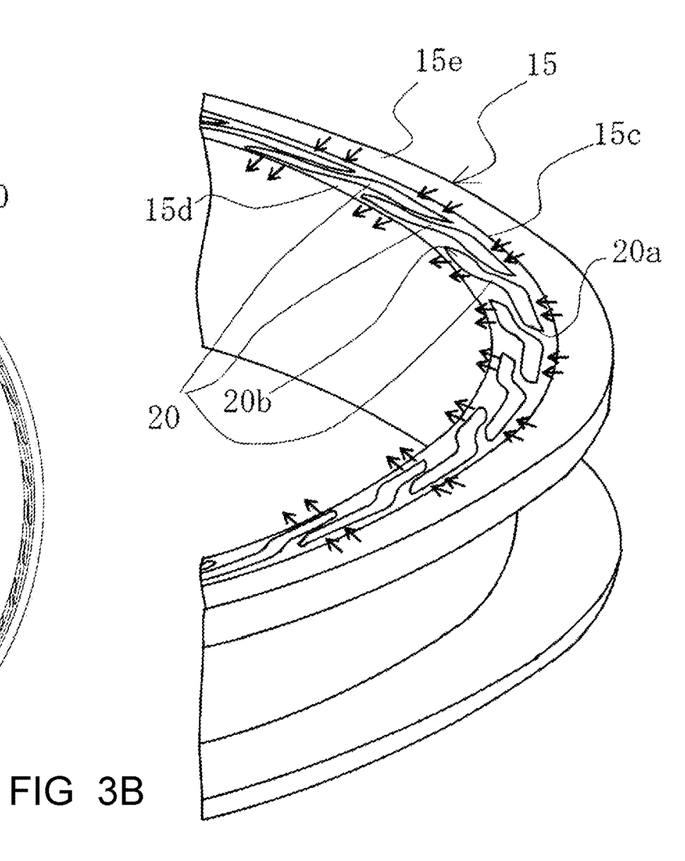
FIG. 3B is an enlarged perspective view of a major portion of the sliding face in FIG. 3A.

As shown in FIGS. 3A and 3B, the step 15c is provided circumferentially continuously, and is provided along the entire circumference of the sliding face 15b of the oil seal member 15. The land 15d on the high-pressure fluid side and the groove 15e on the low-pressure fluid side are also provided continuously along the entire circumference of the sliding face 15b of the oil seal member 15.

The land 15d constituting a sliding face on the high-pressure fluid side of the step 15c is provided with a plurality of pumping grooves 20 to pump oil tending to leak into the low-pressure fluid side, into the high-pressure fluid side by sliding relatively to the side housing 3 (a stationary-side member).

The pumping grooves 20 are provided circumferentially independently. An upstream cavitation formation region 20a of each pumping groove 20 is disposed close to the low-pressure fluid side, and a downstream positive pressure generation region 20b is disposed close to the high-pressure fluid side. As shown by arrows, oil drawn in from the low-pressure fluid side at the cavitation formation region 20a of each pumping groove 20 passes through the pumping groove and is returned from the positive pressure generation region 20b to the high-pressure fluid side.

The pumping grooves 20 shown in FIGS. 3A and 3B, the number of which is fifty, are evenly spaced circumferentially. In each pumping groove 20, the upstream cavitation formation region 20a and the downstream positive pressure generation region 20b each extend circumferentially with a fixed width, forming an arc shape. The upstream cavitation formation region 20a and the downstream positive pressure generation region 20b are radially integrally communicated in a crank shape.

The pumping grooves 20 circumferentially adjacent to each other are arranged such that the positive pressure generation region 20b of the pumping groove 20 located upstream radially overlaps the cavitation formation region 20a of the pumping groove 20 located downstream.

When dynamic pressure (positive pressure) is generated at the positive pressure generation region 20b of the pumping groove 20 located upstream by sliding relatively to the side housing 3, oil is returned mainly to the high-pressure fluid side near this positive pressure generation region 20b, but part of fluid tends to leak into the low-pressure fluid side. However, the cavitation formation region 20a of the downstream pumping groove 20 is provided on the low-pressure fluid side of the positive pressure generation region 20b, so that the oil tending to leak into the low-pressure fluid side is drawn into the cavitation formation region 20a, thus being prevented from leaking into the low-pressure fluid side.

The depth of the pumping grooves 20 is set to an optimum value according to the type of oil, the number of revolutions of the eccentric shaft 7, and pressure. This point will be described in detail later.

Figure 4:
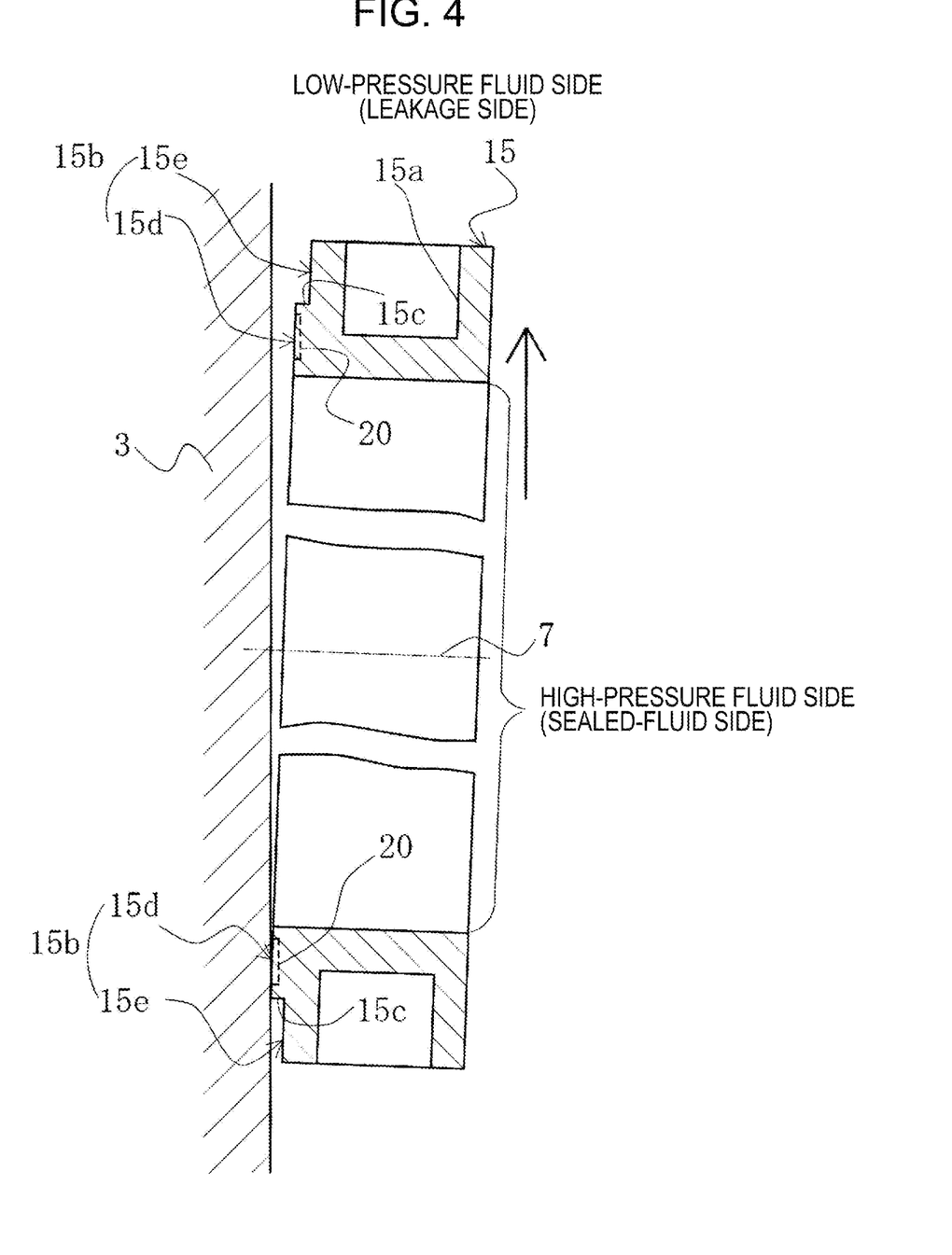
FIG. 4 is a schematic diagram illustrating the action of the oil seal member of the sealing device according to the first embodiment of the present invention.

FIG. 4 is a schematic diagram illustrating the action of the oil seal member 15. With reference to FIG. 4, the action of the oil seal member 15 will be described.

Now, assume that the oil seal member 15 moves upward in the sheet plane of FIG. 4. At a portion of the circumferentially extending oil seal member 15, the portion moving outward (toward the low-pressure fluid side) with respect to the center of the eccentric shaft 7, that is, the sliding face 15b on the upper side of the sheet plane of FIG. 4, a liquid film due to dynamic pressure (positive pressure) is formed by the step 15c, increasing the gap between the side housing 3 and the sliding face 15b. Thus, oil is actively taken in radially inward (into the high-pressure fluid side) while a predetermined amount of oil film is maintained by a predetermined pressing load.

At the same time, at a portion of the circumferentially extending oil seal member 15, the portion moving inward with respect to the center of the eccentric shaft 7, that is, the sliding face 15b on the lower side of the sheet plane of FIG. 4, oil is scraped in by the land 15d, being prevented from entering the radially outer side of the rotor 5 (working chambers 6) from the radially inner side thereof (high-pressure fluid side).

Thus, shear leakage of oil during shearing is prevented.

Further, at the same time, against the possibility that centrifugal force acts on oil adhering to the outside surface of the rotor 5, accompanying the planetary gear motion of the rotor 5, and the oil leaks out from the radially inner side of the rotor 5 (high-pressure fluid side) into the radially outer side thereof (working chambers 6), the land 15d constituting the sliding face on the high-pressure fluid side of the step 15c of the oil seal member 15 is provided with the pumping grooves 20 to pump oil into the high-pressure fluid side by sliding relatively to the side housing 3, so that the oil is prevented from leaking out from the high-pressure fluid side into the low-pressure fluid side.

Thus, pressure leakage due to centrifugal force acting on oil is also prevented.

Figure 5:
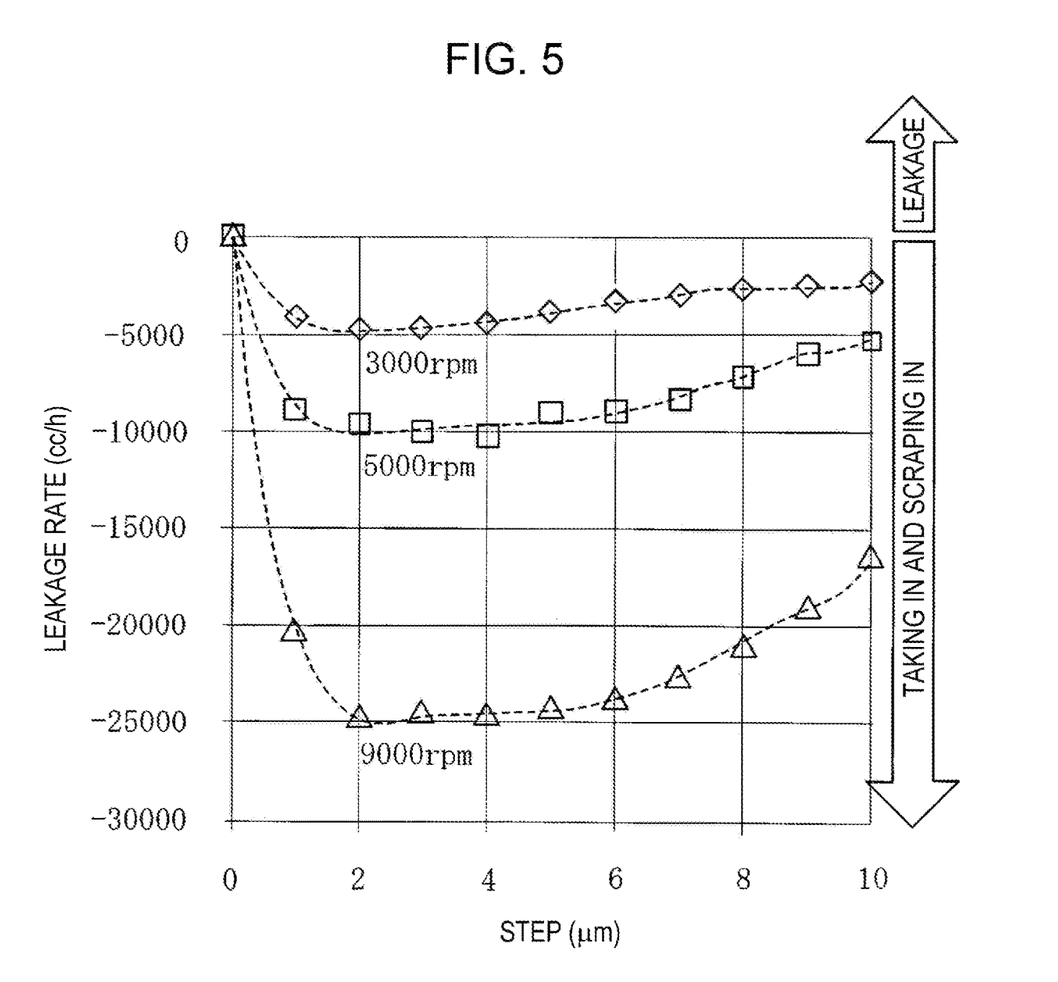
FIG. 5 is a graph showing the state of recovery of shear leakage by the oil seal member of the sealing device according to the first embodiment of the present invention.

FIG. 5 is a graph showing the state of recovery of shear leakage by the oil seal member 15. The horizontal axis represents the height of the step 15c, and the vertical axis the leakage rate. Negative numerical values represent the amount of recovery by taking in and scraping in.

From FIG. 5, it is obvious that the amount of recovery is large with the height d of the step 15c in a range of 2 μm to 8 μm when the number of revolutions of the eccentric shaft 7 is any one of 3000 to 9000 rpm. In particular, the amount of recovery is large in a range of 2 μm to 5 μm.

Thus, the height d of the step 15c is preferably in a range of 2 μm to 8 μm, and more preferably in a range of 2 μm to 5 μm.

The height d of the step 15c is determined in design according to the type of oil and the number of revolutions, and is not limited to a range of 2 μm to 8 μm.

Figure 6:
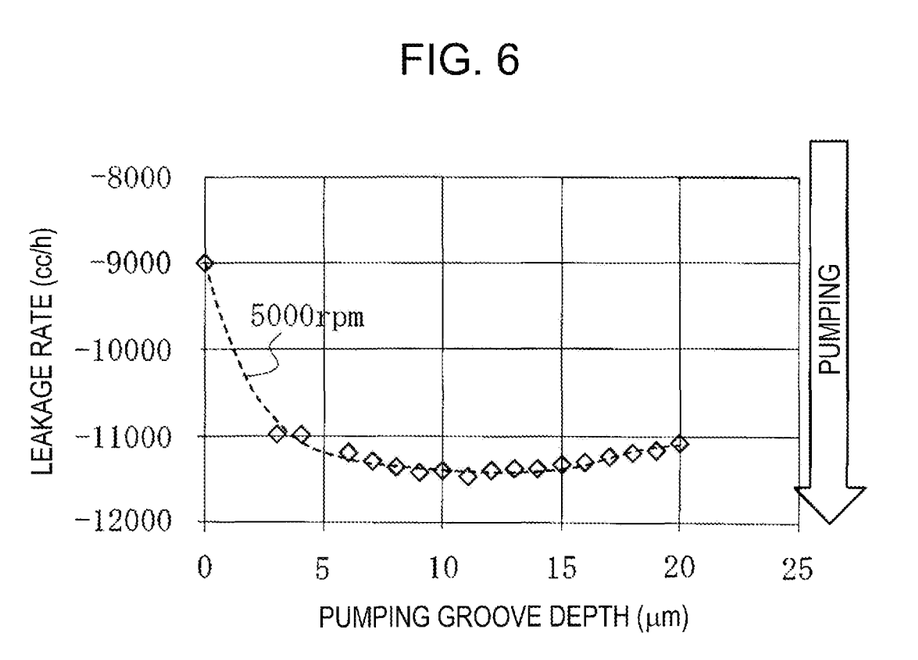
FIG. 6 is a graph showing the state of prevention of pressure leakage by the oil seal member of the sealing device according to the first embodiment of the present invention.

FIG. 6 is a graph showing the state of prevention of pressure leakage by the oil seal member 15. The horizontal axis represents the depth of the pumping grooves 20, and the vertical axis the leakage rate. Negative numerical values represent the amount of pumping by the pumping grooves 20.

From FIG. 6, it is obvious that the pumping effect is large with the depth of the pumping grooves 20 in a range of 5 μm to 20 μm when the number of revolutions of the eccentric shaft 7 is 5000 rpm. In particular, the pumping effect is large in a range of 7 μm to 15 μm.

Thus, the depth of the pumping grooves 20 is preferably in a range of 5 μm to 20 μm, and more preferably in a range of 7 μm to 15 μm.

The sealing device according to the first embodiment achieves the following outstanding effects.

(1) The oil seal member 15 is provided at the outside surface of the rotor 5 performing whirling motion, the sliding face 15b of the oil seal member 15 that slides relatively to the stationary-side member is provided with the step 15c circumferentially, and has the land 15d constituting the relatively high surface formed on the one radial side with respect to the step 15c, and the groove 15e constituting the relatively low surface on the other radial side, and the land 15d is provided with the pumping grooves 20 to pump oil tending to leak from the side of the land 15d into the side of the groove 15e, into the side of the land 15d by sliding relatively to the stationary-side member, so that shear leakage of oil during shearing can be prevented, and pressure leakage due to centrifugal force acting on oil can also be prevented. Thus, a sealing device improved in sealing performance can be provided.

(2) The pumping grooves 20 are provided circumferentially independently, the upstream cavitation formation region 20a of each pumping groove 20 is disposed radially close to the side of the groove 15e constituting the low surface, the downstream positive pressure generation region 20b is disposed close to the side opposite to side of the groove 15e constituting the low surface, and fluid drawn in from the side of the groove 15e constituting the low surface at the cavitation formation region 20a of each pumping groove 20 passes through the pumping groove 20 and is returned from the positive pressure generation region 20b to the side opposite to the side of the groove 15e constituting the low surface, so that the amount of pumping in pressure leakage can be increased, and pressure leakage prevention effect can be enhanced.

Second Embodiment

Figure 7A:
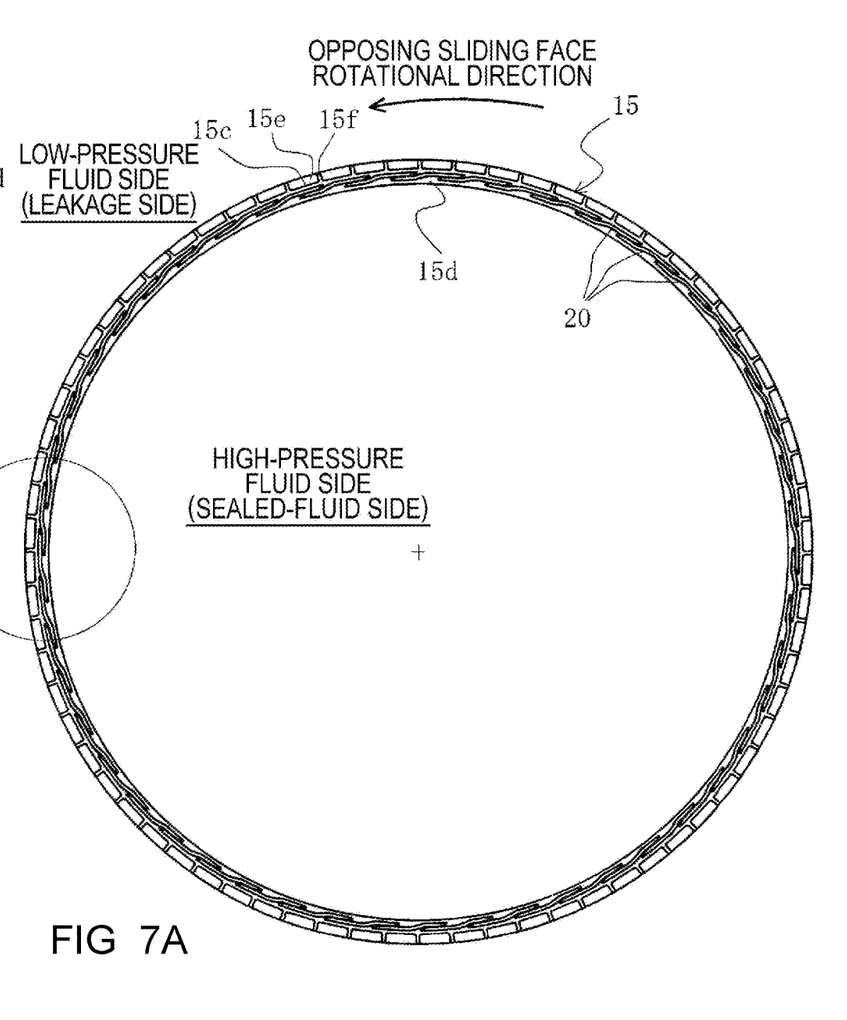
FIG. 7A is an overall view showing a sliding face of an oil seal member of a sealing device according to a second embodiment of the present invention.
Figure 7B:
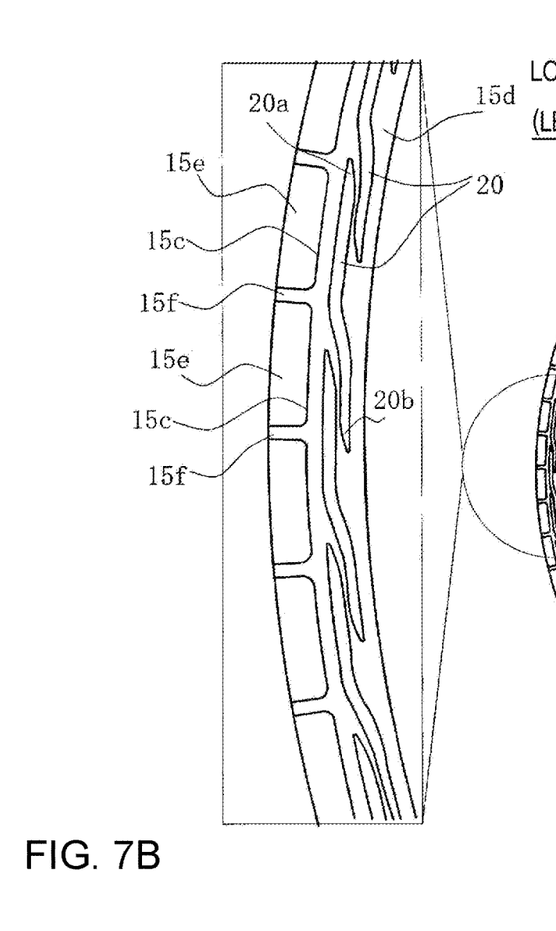
FIG. 7B is an enlarged view of a major portion of the sliding face in FIG. 7A.

With reference to FIG. 7, a sealing device according to a second embodiment of the present invention will be described.

The second embodiment is different from the first embodiment in that a step is provided circumferentially intermittently, but is identical to the first embodiment in the other configuration. The same members are provided with the same reference numerals and letters, and will not be redundantly described.

As shown in FIGS. 7A and 7B, a step 15c is provided circumferentially intermittently in a sliding face 15b of an oil seal member 15. In portions not provided with the step 15c, a land 15d on the high-pressure fluid side is protruded with a predetermined width to the side of grooves 15e on the low-pressure fluid side (radially outward). Protruded portions form dams 15f. Thus, the land 15d on the high-pressure fluid side has a tooth profile like the tooth profile of a sprocket when viewed from the side. The grooves 15e on the low-pressure fluid side are circumferentially provided separately by the dams 15f. Each groove 15e has a substantially rectangular shape.

The number of the dams 15f is determined in design, and may be at least one.

The dams 15f have the function of damming up the circumferential flow of fluid. Fluid dammed up by the dams 15f is taken into the land 15d on the high-pressure fluid side, passes through pumping grooves 20, and is taken into the inner peripheral side from positive pressure generation regions 20b. Thus, circumferential escape of fluid can be prevented, and sealing performance can be improved.

As described above, in addition to the effects of the first embodiment, the sealing device according to the second embodiment can prevent circumferential escape of fluid, taking fluid into the high-pressure fluid side, and thus can further improve sealing performance.

Third Embodiment

Figures 8A, 8B:
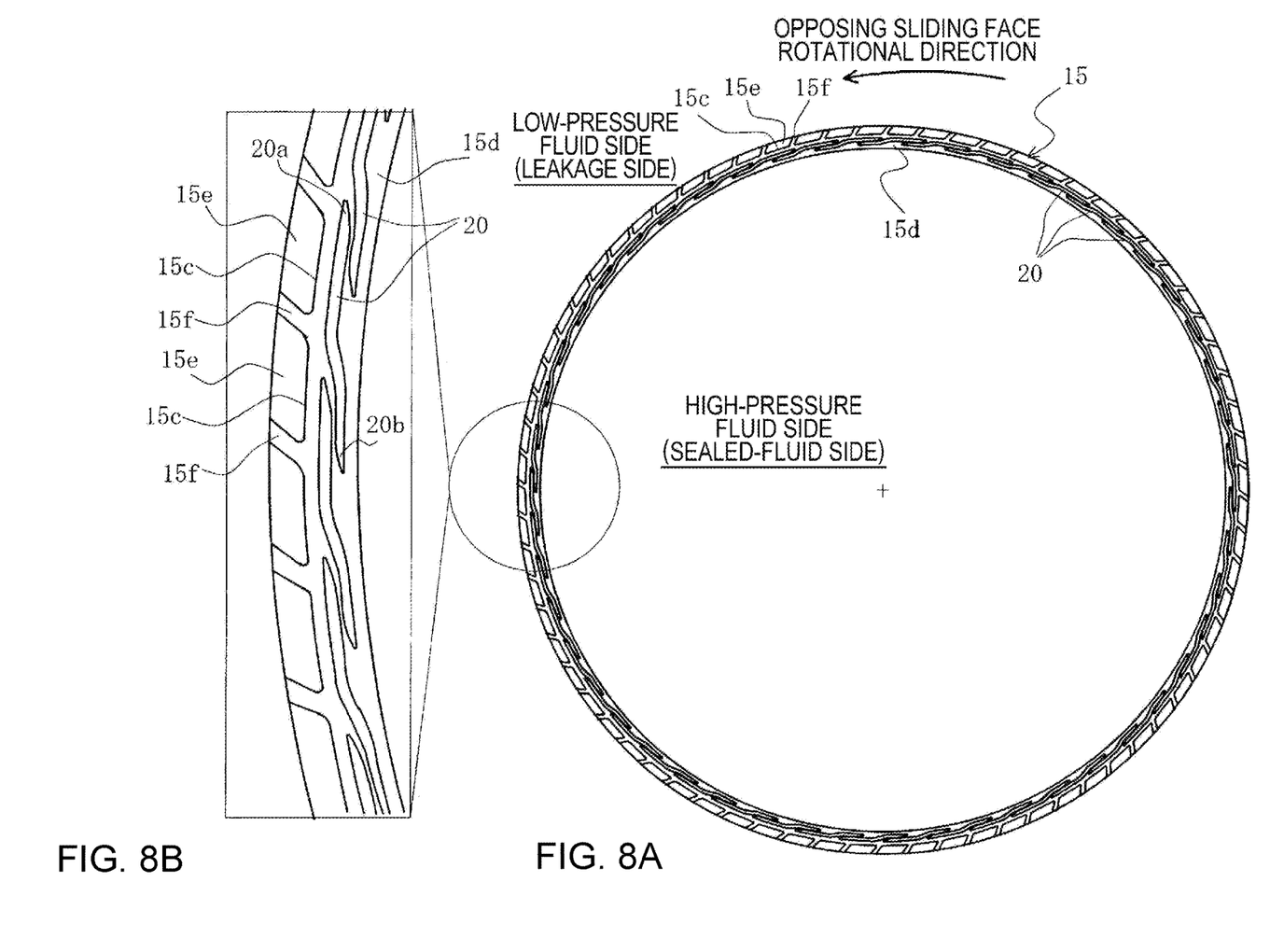
FIG. 8A is an overall view showing a sliding face of an oil seal member of a sealing device according to a third embodiment of the present invention.
FIG. 8B is an enlarged view of a major portion of the sliding face in FIG. 8A.

With reference to FIGS. 8A and 8B, a sealing device according to a third embodiment of the present invention will be described.

The third embodiment has a commonality with the second embodiment in that a step is provided circumferentially intermittently, but is different from the second embodiment in that dams are provided at an angle. The same members as those in the second embodiment are provided with the same reference numerals and letters, and will not be redundantly described.

In FIGS. 8A and 8B, a step 15c is provided circumferentially intermittently in a sliding face 15b of an oil seal member 15. In portions not provided with the step 15c, a land 15d on the high-pressure fluid side is protruded with a predetermined width to the side of grooves 15e on the low-pressure fluid side (radially outward). Protruded portions form dams 15f. The dams 15f are each provided at an angle from the side of the groove 15e (radially outer side) to the side of the land 15d (radially inner side) so that the side of the land 15d (radially inner side) is located downstream.

Thus, the land 15d on the high-pressure fluid side has a shape similar to the shape of the tooth profile of a sprocket when viewed from the side (a shape in which teeth are circumferentially inclined). The grooves 15e on the low-pressure fluid side are circumferentially provided separately by the dams 15f. Each groove 15e has substantially a parallelogram shape.

The number of the dams 15f is determined in design, and may be at least one.

The dams 15f have the function of damming up the circumferential flow of fluid. Fluid dammed up by the dams 15f is taken into the land 15d on the high-pressure fluid side, passes through the pumping grooves 20, and is taken into the inner peripheral side from positive pressure generation regions 20b. At this time, more fluid can be taken into the inner peripheral side since the dams 15f are each provided at an angle from the side of the groove 15e (radially outer side) to the side of the land 15d (radially inner side) so that the side of the land 15d (radially inward) is located downstream.

Thus, circumferential escape of fluid can be prevented, and sealing performance can be improved.

As described above, in addition to the effects of the first embodiment, the sealing device according to the third embodiment can further prevent circumferential escape of fluid, taking fluid into the high-pressure fluid side, and can still further improve sealing performance.

Although the embodiments of the present invention have been described above with reference to the drawings, a specific configuration is not limited to these embodiments. Any changes and additions made without departing from the scope of the present invention are included in the present invention.

For example, although the above embodiments have described an example where a sliding component is used as one of a pair of a rotating seal ring and a stationary seal ring in a mechanical seal device, the sealing device can also be used as a bearing sliding component that slides on a rotating shaft while sealing lubricating oil on axially one side of a cylindrical sliding face.

Further, for example, the above embodiments have described a rotary engine rotor as a member performing whirling motion. The sealing device is not limited to this, and may be applied to an eccentric rotary compressor that performs similar motion.

Further, for example, the above embodiments have described a case where radially one oil seal member is provided. This is not limiting, and two or more oil seal members may be provided, for example. Further, a gas seal for preventing gas in the working chambers 6 from entering inward of the rotor 5 may be provided radially outward of the oil seal member.

Further, for example, the above embodiments have provided the description with the terms high-pressure fluid side and low-pressure fluid side of the step 15c, which are not limiting. The high-pressure fluid side of the step 15c may be regarded as one side, and the low-pressure fluid side as the other side.

Likewise, the above embodiments have provided the description with the terms land 15d and groove 15e, which are not limiting. The land 15d may be regarded as a relatively high surface, and the groove 15e as a relatively low surface.

Further, for example, the above embodiments have described a case where the ratio b/B between the width b of the land 15d and the width B of the sliding face 15b is set to about 0.5, for example. The ratio b/B is not limited to this, and may be set in a range of $0.3 < b/B < 0.7$.

Further, for example, the above embodiments have described a case where the pumping grooves 20 circumferentially adjacent to each other are arranged such that the positive pressure generation region 20b of the pumping groove 20 located upstream radially overlaps the cavitation formation region 20a of the pumping groove 20 located downstream, which is not limiting. For example, the pumping grooves 20 adjacent to each other may be spaced circumferentially.

The invention claimed is:

1. A sealing device provided on a rotary engine rotor, the rotor being housed in a rotor housing chamber formed by a rotor housing and side housing, the sealing device comprising:

an oil seal member provided at an outside surface of the rotor, the oil seal member having a sliding face that slides relatively to the side housing, the sliding face being provided with a step extending circumferentially, and having a relatively high surface formed on one radial side with respect to the step and a relatively low surface on the other radial side, the high surface being provided with pumping grooves to pump oil tending to leak from the high surface side into the low surface side, into the high surface side by sliding relatively to the side housing, wherein the pumping grooves are provided circumferentially independently, an upstream cavitation formation region of each of the pumping grooves is disposed radially close the low surface side and a downstream positive pressure generation region is disposed close to a side opposite to the low surface side, and fluid drawn in from the low surface side at the cavitation formation region of each of the pumping grooves passes through the pumping groove and is returned from the downstream positive pressure generation region to the side opposite to the low surface side.

2. The sealing device according to claim 1, wherein the step is provided circumferentially continuously.

3. The sealing device according to claim 1, wherein the step is provided circumferentially intermittently, and a portion not provided with the step is provided with a dam formed by the high surface protruding to the low surface side.

4. The sealing device according to claim 3, wherein the dam is provided at an angle from the low surface side to the high surface side so that the high surface side is located downstream.

\* \* \* \* \*